INVENTOR.
ANGUS R. PARKER
EARL W. RUDOLPH
BY

ATTORNEY

United States Patent Office 3,406,444
Patented Oct. 22, 1968

3,406,444
METHOD OF MAKING A JOINT
Angus R. Parker, 121 Oak Ave., Bellmawr, N.J. 08030, and Earl W. Rudolph, 440 N. Coles Ave., Maple Shade, N.J. 08052
Filed Aug. 12, 1965, Ser. No. 479,352
5 Claims. (Cl. 29—482)

The invention described herein may be manufactured and used by or for the Government of the United States of America for governmental purposes without the payment of any royalties thereon or therefor.

The present invention relates generally to a novel and improved method of welding. More particularly, it relates to a novel and improved method of welding metallic tubular members end to end.

Piping and tubing having substantial wall thicknesses are now commonly required to withstand the high temperatures and pressures of various present day industrial and other uses and applications. Many welding techniques and procedures have been devised and used in the past to join the abutting ends of such tubing. Thus, for example, so called chill rings are sometimes positioned within the abutting ends of the pipes or tubing to be joined to limit excess weld metal from being deposited about the internal bead of the weld. Chill rings, however, themselves often unduly obstruct flow within the pipe or tubing and must therefore be removed by an internal boring or other cumbersome and time consuming operation.

It has also often been the practice in butt welding ends of heavy wall pipe to initially machine the pipe ends which are to be joined, so as to reduce the wall thickness of each pipe a predetermined distance in from the contemplated weld joint. When the pipe ends are then brought together in longitudinal alignment, a substantial groove is formed which extends into the walls of the juxtaposed pipes. The reduced thickness root ends of the pipes are then butted and fused together by the application of a suitable amount of heat. Since the contiguous root faces are substantially less thick than the unmachined portions of the pipes, complete fusion of the metal in the joint can be obtained fully across the opposed root faces. In subsequent welding passes, the remainder of the grove between the pipes is filled with weld metal supplied by consumable electrodes or welding rods of suitable composition. It was found, however, that when adjoining root sections of pipe are initially fused in this way, there is often an insufficient supply of weld metal available to form a satisfactory internal bead at the joint. Microcracking and other failures in such welds therefore often were found to result. In order to remedy this, it then became general practice to use so called welding rings between the pipe ends to be joined. Metal from these rings which were generally greater in outside diameter than the diameter of adjacent root sections theoretically provide the precise amount of added metal necesary to form a strong flush weld on the inside of the joint. Welding rings of this type have been found, however, to be generally cumbersome, difficult to center properly between adjoining pipe ends, and difficult to supply in quantity in all proper sizes.

It is therefore a principal object of the present invention to provide a novel and improved method of butt welding piping and tubular members which ensures a strong weld across the full wall thickness of the pipes or tubular members to be joined.

It is a further object of the invention to provide a novel and improved method of welding piping end to end without the use of conventional chill rings or consumable welding rings.

It is a further object of the invention to provide a novel and improved method of welding piping end to end wherein the welding operator can readily determine when full fusion of the root sections of the juxtaposed pipe ends occurs.

Other objects and many of the attendant advantages of this invention will be readily appreciated as the same becomes better understood by reference to the following detailed description when considered in connection with the accompanying drawing wherein.

Figure 2:
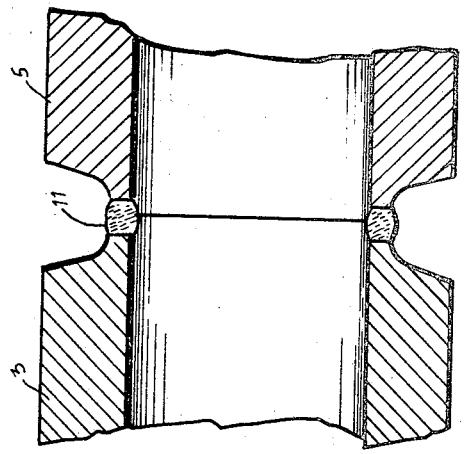
FIG. 2 is a similar cross-sectional view of the tubular members in FIG. 1 after the initial heliarc flange fusing step has been completed.
Figure 1:
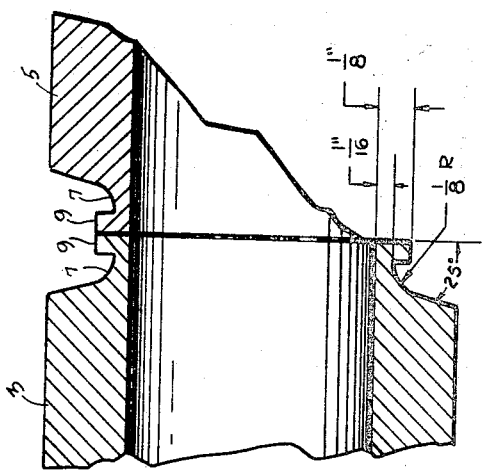
FIG. 1 is a cross-sectional view of a pair of tubular members properly machined and butted for joinder in accordance with the present invention.

Referring now more particularly to the drawings, it will be noted that the ends of the tubular members or or pipes 3 and 5 which are to be joined are first cut away by a suitable machining operation to form a root wall portion 7 with a flanged extremity 9. The machined ends of pipes 3 and 5 are then butted and aligned along their longitudinal axes. The interior of the juxtaposed pipes is then purged in any suitable conventional manner preferably with argon or another suitable inert gas. The abutting flanged ends of pipes 3 and 5 are then fused preferably by a heliarc process without the use of any filler rod metal. The properly dimensioned flanged portions of pipes 3 and 5 upon being fused provide the exact quantity of metal necessary to insure a strong flush internal weld 11 of sufficient thickness to prevent microcracking or burn through on succeeding metal arc weld passes. The properly dimensioned flanged extremities of pipes 3 and 5 also provide an accurate gauge which indicates to the welder precisely when sufficient heat has been applied for a sound completely fused weld. Thus, as the flanged portions of pipes 3 and 5 become completely fused and merge with the reduced thickness root wall portions 7 of pipes 3 and 5, the welding operator progresses about the circumference of the joint on his initial pass. The remainder of the groove formed between the ends of pipes 3 and 5 by the above described machining operation is then filled with filler rod on successive passes of tungsten inert gas welding operation or with the consumable electrodes of a conventional metallic arc process.

Preferred dimensions of the juxtaposed pipe ends to be adjoined after the machining operation are as follows:

Thickness of root wall portion _____ inch __ 1/16
Thickness of flanged extremity _____ do __ 1/16
Width of flanged extremity _____ do __ 1/16
Angle of surface defining groove _____ degrees __ 25
Radius of curvature from linear groove defining surface to root wall portion _____ inch __ 1/8
Spacing of juxtaposed pipe ends _____ Negligible The welding joint processed in the above described manner permits the fabrication of welded joints in pipe and other tubular members with a new degree of ease and accuracy and a much greater assurance of uniformity and strength than heretofore possible. The internal weld produced is clean and uniformly flush with the adjoining peripheral surfaces of the pipe ends so as to minimize internal obstruction to fluid flow therethrough. Even when the pipes and fittings that are to be joined vary in inside diameter, the fused metal from the flanged extremities of the pipes have been found to provide sufficient metal to fill internal diameter discontinuities with a smooth obstruction-free internal weld. Such desirable results are readily obtained without the use of chill rings or welding rings which must be metallurgically matched with the composition of the pipes to be joined, which are cumbersome to align and position during the welding operation and which must be provisioned in multitudinous sizes and shapes to accommodate the various sizes of pipes and fittings to be joined.

Obviously, many modifications and variations of the present invention are possible in the light of the above teachings. It is therefore to be understood that within the scope of the appended claims, the invention may be practiced otherwise than as specifically described.

What is claimed is:
1. A process of butt welding the adjoining ends of a pair of tubular members, said process comprising:
   (a) machining the ends of the tubular members which are to be adjoined so as to form a root wall portion of reduced thickness with a flanged end portion of a predetermined increased thickness;
   (b) aligning the adjoining ends of the tubular members to be butt welded;
   (c) fusing the flanged portions of the adjoining ends of the tubular members;
   (d) and filling with weld metal the machined space between adjoining ends of the tubular members.

2. A process of butt welding the adjoining ends of a pair of tubular members, said process comprising:
   (a) machining the ends of the tubular members which are to be adjoined so as to form a root wall portion of reduced thickness with a flanged end portion of a predetermined increased thickness;
   (b) aligning the adjoining ends of the tubular members to be butt welded;
   (c) purging the interior of the tubular members with an inert gas;
   (d) and filling with weld metal the machined space between adjoining ends of the tubular members.
   (e) and filling with weld metal the machined space between adjoining ends of the tubular members.

3. A process of butt welding the adjoining ends of a pair of tubular members, said process comprising:
   (a) machining the ends of the tubular members which are to be adjoined so as to form a root wall portion of reduced thickness with a flanged end portion of a predetermined increased thickness;
   (b) aligning the adjoining ends of the tubular members to be butt welded;
   (c) fusing the flanged portions of the adjoining ends of the tubular members with a heliarc process without the use of filler metal;
   (d) and filling with weld metal the machined space between adjoining ends of the tubular members.

4. A process of butt welding the adjoining ends of a pair of tubular members, said process comprising:
   (a) reducing the wall thickness of both tubular members adjacent the ends thereof to be adjoined, leaving, however, on the end of one said tubular member a terminal flanged portion which includes the proper amount of metal to flush weld the interior joint between the tubular members;
   (b) aligning the adjoining ends of the tubular members to be butt welded;
   (c) fusing the flanged portion of the said one tubular member into the joint between the tubular members;
   (d) and filling with weld metal the remaining space between adjoining ends of the tubular members.

5. A process of butt welding the adjoining ends of a pair of tubular members, said process comprising:
   (a) machining the ends of the tubular members which are to be adjoined so as to form a root wall portion of reduced thickness with a flanged end portion of a predetermined increased thickness;
   (b) aligning the adjoining ends of the tubular members to be butt welded;
   (c) purging the interior of the tubular members with an inert gas;
   (d) fusing the flanged portion of the said one tubular member into the joint between the tubular members;
   (e) and filling with weld metal the remaining space between adjoining ends of the tubular members.

References Cited

UNITED STATES PATENTS

| | | | |
|---|---|---|---|
| 1,771,961 | 7/1930 | Ipsen | 29—483 X |
| 1,935,063 | 11/1933 | Scott | 29—482 |
| 2,856,509 | 10/1958 | Stanchus | 219—74 |

JOHN F. CAMPBELL, *Primary Examiner.*

J. L. CLINE, *Assistant Examiner.*